(12) United States Patent
Fabian

(10) Patent No.: US 10,074,252 B1
(45) Date of Patent: Sep. 11, 2018

(54) ELECTRONIC ARTICLE SURVEILLANCE (EAS) TAG VERIFICATION

(71) Applicant: NCR Corporation, Duluth, GA (US)

(72) Inventor: Kenneth Joseph Fabian, Grayson, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/636,133

(22) Filed: Jun. 28, 2017

(51) Int. Cl.
- *G08B 13/14* (2006.01)
- *G08B 13/24* (2006.01)
- *G06K 7/10* (2006.01)

(52) U.S. Cl.
CPC ....... *G08B 13/246* (2013.01); *G06K 7/10366* (2013.01); *G08B 13/242* (2013.01)

(58) Field of Classification Search
CPC . G08B 13/246; G08B 13/242; G06K 7/10366
USPC ...................................................... 340/572.1
See application file for complete search history.

(56) References Cited

U.S. PATENT DOCUMENTS

| | | | | |
|---|---|---|---|---|
| 6,281,796 B1 * | 8/2001 | Canipe | ................ | G08B 13/246 340/551 |
| 7,316,355 B2 * | 1/2008 | Canipe | ................ | G08B 13/246 235/462.13 |
| 8,058,994 B2 * | 11/2011 | Aguirre | .............. | G08B 13/2488 340/10.1 |
| 2003/0075602 A1 * | 4/2003 | Wike, Jr. | ............. | G08B 13/246 235/383 |

\* cited by examiner

*Primary Examiner* — John A Tweel, Jr.
(74) *Attorney, Agent, or Firm* — Schwegman, Lundberg & Woessner (57) ABSTRACT

A distance of an Electronic Article Surveillance (EAS) tag on an item from a scanner is determined when a code for the item is read by the scanner. When the distance is greater than a predefined distance, a delay period is initiated and when the delay period expires with the EAS tag not having been placed within the predefined distance from the scanner, an alert is raised to an operator of a Point-Of-Sale (POS) terminal.

18 Claims, 4 Drawing Sheets

ELECTRONIC ARTICLE SURVEILLANCE (EAS) TAG VERIFICATION

BACKGROUND

Many products today include an Electronic Article Surveillance (EAS) tag that is situated somewhere in the product or product packaging. The same products include barcodes or embedded hidden watermarks that are integrated throughout the product packaging representing information included in a barcode. The EAS tag provides a security mechanism against consumer theft, such that when the EAS tag is not deactivated at the Point-Of-Sale (POS) terminal during checkout and the consumer passes through EAS detection scanners when exiting a store, the detection scanners trigger a loud buzzing that can be heard by staff of the store to investigate whether theft occurred or whether a false alarm was triggered by the detection scanners.

Scanners can often detect and read a barcode from the product packaging at a greater distance than EAS deactivators can reliably deactivate EAS tags situated in or on the product packaging. Also, and in many cases, the position of the barcode on the product packaging is not in proximity to the position of the EAS tag on the product packaging. In fact, the EAS tag may be situated on a side of the product packaging that lacks any barcode. EAS tags are typically not visible on the product packaging whereas the barcodes are visible and may redundantly appear in multiple locations on the product packaging of a single product.

Scanners are beginning to transition from devices that recognized barcodes, to devices that recognize the product, even if the barcode cannot be seen (object recognition). The product recognition even might occur before, during, or after the object passes through, or around the "scan zone" where barcodes can be read by the scanner. In this case, the scanner would send the barcode of the object recognized.

Consumers performing self-checkouts at Self-Service Terminals (SST) are completely unaware that a product being purchased may include an EAS tag, and clerks performing cashier-assisted checkouts are trained to quickly locate the barcode on the product packaging and pass that location in front of the scanner. Cashiers are also typically unaware when a product may include an EAS tag and when a product does not include an EAS tag. Furthermore, even when a cashier knows a product includes an EAS tag, the cashier does not typically know where the location of that EAS tag is at on the product packaging.

When an EAS tag is not deactivated (typically by altering an electrical or acoustic-magnetic circuit in the tag using an electromagnetic field), the detection scanners will produce an audible alarm when the customer exits the store. These false positives can be annoying to store staff and during heavy consumer traffic cause congestion at checkout stations. The false alarms are so common that they are typically ignored by store personnel and customers. Consequently, many stores may intentionally deactivate their detection scanners thereby acceding to greater security risks for theft even when the stores have invested in and have the additional security that EAS tags and technology provide. Additionally, EAS equipment suppliers are demanding that vendors of scanners reduce the functionality that the scanners are capable of achieving such that the scanners can only read the barcodes or watermarks when at shorter distance that the EAS tags can be deactivated.

SUMMARY

In various embodiments, a method and a system for EAS tag verification are provided.

According to an embodiment, a method for EAS tag verification is presented. For example, a code scanned from an item by a scanner is detected as having an EAS tag that was outside a predefined distance from the scanner. Next, an alert is raised to an operator of a terminal indicating that the EAS tag is still activated on the item.

DETAILED DESCRIPTION

Figure 1:
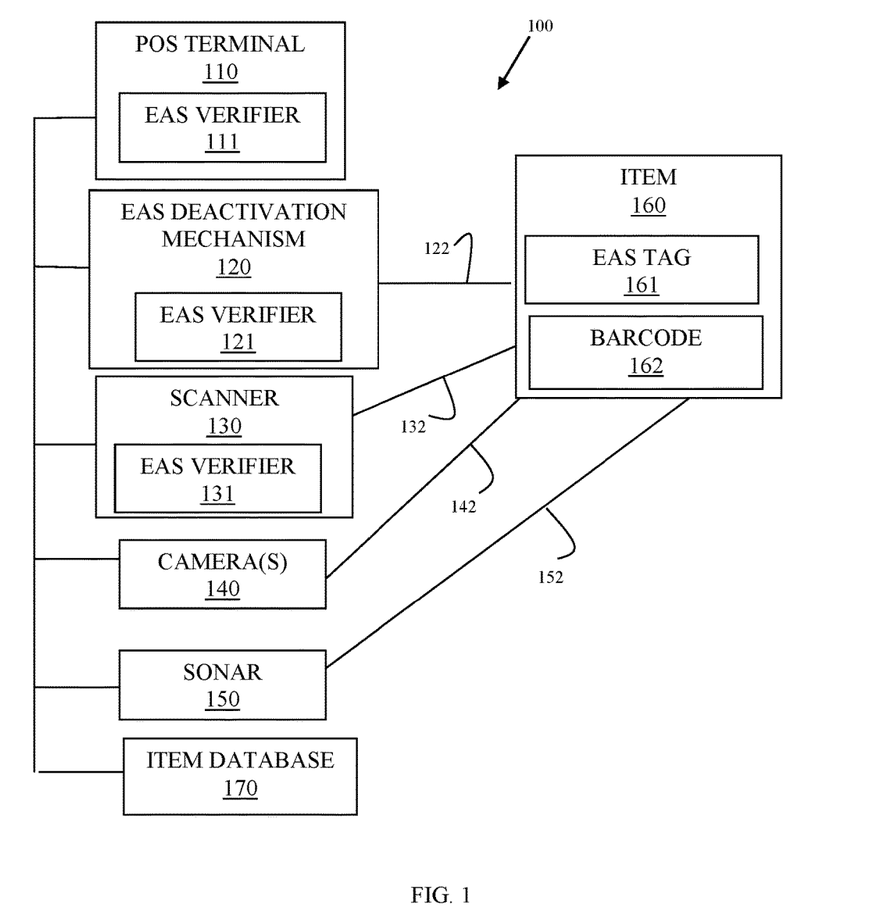
FIG. 1 is a diagram illustrating various arrangements of a system for EAS tag verification, according to an example embodiment.

FIG. 1 is a diagram illustrating various arrangements of a system 100 for EAS tag verification, according to an example embodiment. The components of the system 100 are illustrated for purposes of ease of comprehension of the teachings presented herein and are not drawn to scale. Moreover, the system 100 only illustrates those components necessary for understanding the teachings presented herein; it is to be understood that other components may be present that do not depart from the teachings provided.

The system 100 includes: a POS terminal 110, an EAS deactivation mechanism 120, a scanner 130, optionally one or more additional scanners 140, optionally a sonar sensor or sonar-enabled device 150 (hereinafter just sonar 150), an item 160 having an EAS tag 161 and a barcode 162, and an item database 160. It is noted that as discussed herein the barcode 162 can be a watermark; thus, barcode 162 and watermark 162 may be used interchangeably and synonymously herein.

The system 100 may also include one or more EAS verifiers (111, 121, and/or 131). The EAS verifier (111, 121, and/or 131) is software embodied as executable instructions that are executed from non-transitory memory by a processor of the POS 110, the EAS deactivation mechanism 120, and/or the scanner 130. The processing of the EAS verifier (111, 121, and/or 131) may also be added as an enhancement to existing POS transaction managers for enhanced item transaction processing. For purposes of the discussing that follows the EAS verifier (111, 121, and/or 131) is referred to as EAS verifier 111; however, it is to be noted that the placement of the EAS verifier may be in the scanner 130 and/or the EAS deactivation mechanism 120, or the placement may exist as different and multiple instances of the EAS verifier (111, 121, and/or 131) that cooperate with one other to perform the processing discussed below for the EAS verifier 111.

The various components of the system 100 and the interaction between the component pieces will now be discussed within an operating scenario where an item 160 having an EAS tag 161 is being scanned by the scanner 130 for identifying the item and the item price for a transaction of a consumer occurring at the POS terminal 110.

The item 160 may be scanned by the consumer when the POS terminal 110 is a SST; alternatively the item 160 may be scanned by a cashier when the POS terminal 110 is a cashier-assisted terminal.

Additionally, the EAS verifier 111 is configured with a parameter value that identifies the distance that the item 160 needs to be at or under from a lens of the scanner 130 for knowing that the EAS deactivation mechanism 120 can reliably blow (destroy) the EAS tag 161 on the item 160. In an embodiment, that parameter value that identifies the distance is approximately up to 6 inches from a vertical scanner window, up to 2 inches from a horizontal scanner window and up to 2 inches from a centerline that bisects the horizontal and vertical windows (in a bioptic scanner 130).

When the item 160 has the barcode read 162 off the item 160 by the scanner 130, the EAS verifier 111 issues a lookup request to the item database 170. The database 170 is enhanced to include a field indicating whether items have an EAS tag and, in some cases, a description of a location of where the EAS tags are located on each of the items.

If the item includes no indication for an item identifier located in the item database 170 that the item includes an EAS tag, then the item is processed normally and at the rate and distance that the scanner 130 is capable of reading and processing the barcode for that item.

The processing that follows assumes that the item 160 has its barcode 162 read by the scanner 130 and the search (lookup) in the database 170 indicated that the item 160 also is to include the EAS tag 161.

In an embodiment, when the EAS verifier 111 determines that the barcode 162 was read when the item 160 was within the parameter value distance from the scanner a command is issued to produce a beep from speakers or an attached buzzer of the scanner 130 and/or POS terminal 110. This provides an audible clue to the operator (customer or cashier as discussed above) that the EAS tag 161 has been deactivated for the item.

The scanner 130 software is modified to delay the traditional beep that indicates to the operator that the scanner 130 has successfully read the barcode 162 (customer for a POS terminal 110 that is a SST and cashier when the POS terminal 110 is a cashier-assisted terminal) until the EAS verifier 111 has determined whether the item 160 was within the parameter value distance from the scanner 130 when the scanner 130 read the barcode 162.

The delay is another configured period of time provided as another parameter value to the EAS verifier 111.

During the delay period, if the EAS verifier 111 determines that the item 160 was re-situated within the first parameter value distance (distance that reliably assures that the EAS deactivation mechanism 120 has blown the EAS tag 161), then no further action is taken by the EAS verifier 111.

If the delay period expires (lapses) without the EAS verifier 111 confirming that the item 160 was re-situated within the first parameter value distance from the scanner 130, then the EAS verifier 111 interacts with a transaction manager to force a display image (or video illustration) of the item and/or instructions for placing the item within the first parameter value distance from the scanner 130 and with a proper side of the item 160 having the EAS tag 161 illustrated that should be facing the scanner 130 (the location of the EAS tag 161 on the item 160, the images, the instructions, and/or the video illustration can be obtained from the item database 170 when the item identifier from the barcode 162 was used to search the item database 170). The EAS verifier 111 then confirms the item 160 is actually and subsequently situated and placed at the first parameter distance from the scanner 130 before the transaction having the item 160 is allowed to proceed with a next item or before the transaction is permitted to conclude at the POS terminal 110 when the item 160 is a last or only item 160 for the transaction.

In an embodiment, if any cameras 140 are utilized with the system 100 and during the delay period, if image and video processing indicates that the item 160 was moved to a bagging area, then the delay period is terminated as if the delay period had passed normally by the EAS verifier 111. This permits the EAS verifier 111 to perform the processing discussed above when the delay period actually expires to ensure the EAS tag 162 is destroyed (blown) even before the delay period actually expires.

The EAS deactivation mechanism 120 may be integrated into the scanner 130 or is situated in close proximity to the scanner 130, such that instructions given and distances determined are based off the item's distance from the scanner 130 when the barcode is read by the scanner 130.

The EAS verifier 111 can determine the orientation and distance (position) of the item 160 when the item's barcode 162 is read by the scanner 130 in a variety of manners.

For example, a sonar 150 may be used to obtain an actual distance from the scanner 130 that the item 160 is when read by the scanner 130. The sonar 150 may also be integrated into the scanner 130 or may be situated in close proximity to the scanner 130.

In another case, cameras embedded in the scanner 130 and/or additional adjacent cameras 140 can be used to obtain multiple images of the item 160 when the item is scanned by the scanner 130 at known angles. The distances of the cameras 140 (and/or embedded cameras of the scanner 130) to the POS terminal 110 and surfaces and components of the POS terminal 110 (such as bagging area, end of counter, start of counter, cash drawer, customer display, clerk display, scale, etc.) can also be configured as constant distances. Utilizing these known distances and the known angles, calculations can be performed to estimate the distance of the item 160 from the scanner 130 when the item 160 has the barcode 162 read by the scanner 130.

The cameras 140 and/or embedded cameras of the scanner 130 can also be used to determine the orientation of the item 160 when the barcode was read in the distance calculation. The orientation and distance is referred to as the item's position when the barcode 162 is read by the scanner 130. The orientation may also be used to adjust the distance calculation. For example, if the distance is of the item 160 from the scanner 130 when the barcode is read is 4 inches and the item is 12 inches long and the expected location for the EAS tag 162 (identified from the item database 170 lookup) is on an opposite end of the item 160 based on the determined orientation of the item 160, then the distance can be adjusted from 4 to 16 inches. Assuming the first parameter value distance is 4 inches, the EAS verifier 111 calculates the distance as being too far to blow the EAS tag 161 at 16 inches (distance adjusted for the orientation and location of the EAS tag 161 on the item 160).

Therefore, the determined distance of the item 160 is the adjusted distance based on the item's orientation when scanned by the scanner 130, the location of the EAS tag 161 on the item 160, and the distance from the scanner 130 to the barcode surface of the item that had the barcode 130.

In another case, the EAS verifier 111 measures distances using the cameras 140 and/or embedded cameras in the scanner 130 with phase shift (autofocus) pixels to measure the distances, or to use 2 or more cameras 140 for triangulation, or use phase shift (autofocus) pixels and triangulation.

In an embodiment, the EAS tag 161 is located in close proximity to a standard sized European Article Number (EAN), Universal Product Code (UPC), or similar barcode. When the EAS tag 161 is present, the system 100 requires that the barcode be presented close to the scanner window even if another technique is initially used to identify the product. This ensures that existing and legacy equipment can implement the processing described herein if a size of the barcode is known. The length of the barcode measured in pixels or motor revolutions is strongly correlated with distance from the scanner 130.

In an embodiment, when measuring distance, a vector that is a representation of distance in a three-dimensional (3D) box. For example, in a bioptic scanner the deactivation area above the horizontal window may be a rectangular box that is two inches high, 4 inches wide, and 5 inches deep.

Again, the information provided when a barcode 162 is successfully read is delayed from being provided to the transaction manager of the POS terminal 110 until the EAS verifier 111 determines that the item was within the parameter value distance from the scanner 130 or was subsequently placed within the parameter value distance from the scanner 130. Once the EAS verifier 111 verifies that this has occurred, then the EAS verifier 111 permits a next item for the transaction to be scanned or permits the transaction to conclude if the item 160 was the last or only item 160 for the transaction. A delay period provides a chance for auto correction by the operator (customer or cashier) or assisted correction through assistance of the EAS verifier 111 through interaction with the transaction manager of the POS terminal 110 (as discussed above).

If object recognition is used at the POS terminal 110 for barcode recognition such that barcode data is generated as if there were a barcode or watermark present on the item, the distance calculations can still be used as presented based on the distance of the item from the scanner 130 when the object was recognized for the generated barcode data.

The above-noted processing permits multiple items of transaction to be processed more efficiently and accurately, such that items with no EAS tag can have their barcodes processed near instantaneously and at distances from the scanner 130 that the scanner is capable of performing reads from. This improves the transaction processing throughput at the POS terminal. Additionally, the above-noted processing ensures that EAS tags are verified and properly blown which will reduce false alarms triggered by EAS detection sensors when the customer exits the retailer with purchased items.

These and other embodiments are now discussed with reference to the FIGS. 2-4.

Figure 2:
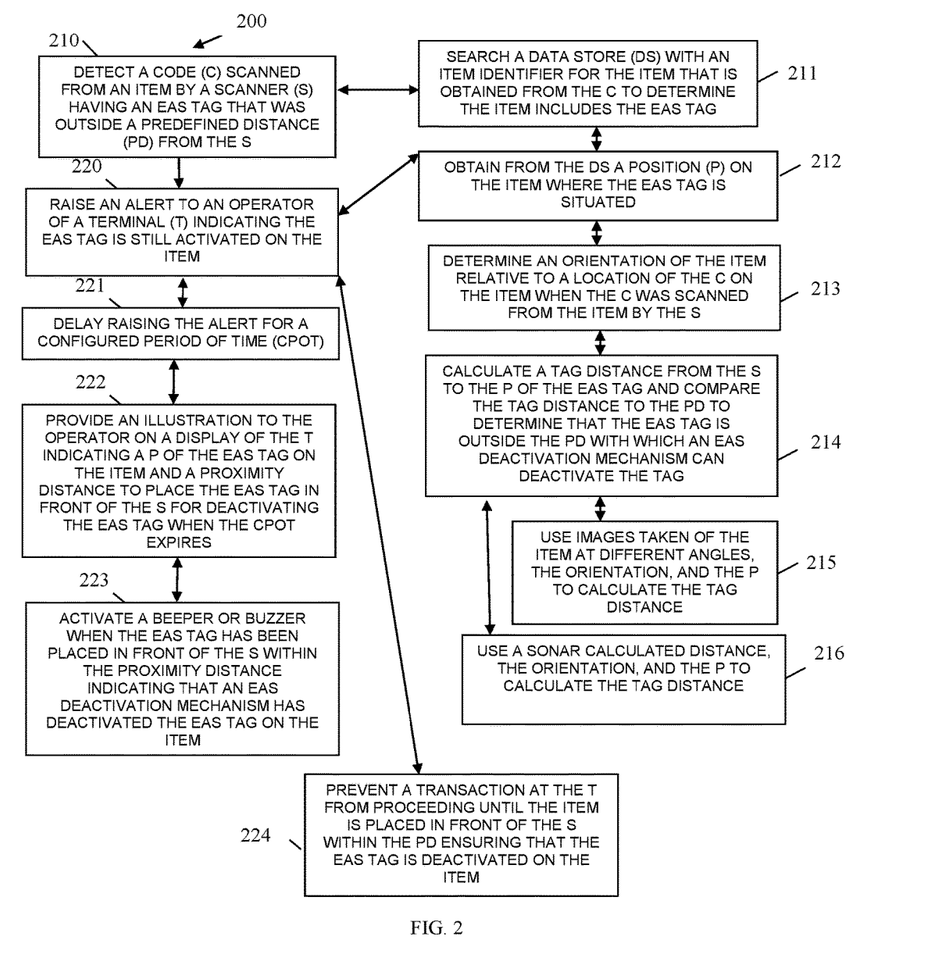
FIG. 2 is a diagram of a method for EAS tag verification, according to an example embodiment.

FIG. 2 is a diagram of a method 200 for EAS tag verification, according to an example embodiment. The software module(s) that implements the method 200 is referred to as an "EAS verifier." The software modules are executable instructions that are loaded into memory of a device and executed by one or more processors of that device. The EAS verifier may have access to one or more networks during execution. The networks can be wired, wireless, or a combination of wired and wireless.

In an embodiment, the device that executes the EAS verifier is the scanner 130.

In an embodiment, the device that executes the EAS verifier is the EAS deactivation mechanism 120.

In an embodiment, the device that executes the EAS verifier is POS terminal 110.

In an embodiment, multiple cooperating instances of the EAS verifier process on two or more of: the scanner 130, the EAS deactivation mechanism 120, and the POS terminal 110.

In an embodiment, the POS terminal is a SST operated by a customer during a checkout at the POS terminal.

In an embodiment, the POS terminal is a cashier-assisted terminal operated by a cashier during a customer checkout at the POS terminal.

In an embodiment, the EAS verifier is one or more of the EAS verifiers 111, 121, and/or 131.

At 210, the EAS verifier detect a code scanned from an item by a scanner having an EAS tag that was outside a predefined distance from the scanner for purposes of deactivating or destroying the EAS tag by an EAS deactivation device/mechanism.

In an embodiment, the code is a barcode.

In an embodiment, the code is a watermark.

According to an embodiment, at 211, the EAS verifier searches a data store with an item identifier that is obtained from the code to determine that the item includes the EAS tag. In an embodiment, the data store is the item database 170.

In an embodiment of 211 and at 212, the EAS verifier obtains from the data store a position on the item where the EAS tag is known to be situated/placed/present.

In an embodiment of 212 and at 213, the EAS verifier determines an orientation of the item relative to a location of the code on the item when the code was scanned from the item by the scanner.

In an embodiment of 213 and at 214, the EAS verifier calculates a tag distance from the scanner to the position of the EAS tag on the item. The EAS verifier compares the tag distance to the predefined distance to determine that the EAS tag is outside the predefined distance which an EAS deactivation device/mechanism can successfully deactivate the EAS tag.

In an embodiment of 214 and at 215, the EAS verifier uses images taken of the item at different angles, the orientation, and the position to calculate the tag distance.

In an embodiment of 214 and at 216, the EAS verifier uses a sonar calculated distance, the orientation, and the position to calculate the tag distance.

At 220, the EAS verifier raises an alert to an operator of a terminal indicating that the EAS tag is still activated on the item.

In an embodiment, at 221, the EAS verifier delays raising the alert for a configured period of time.

In an embodiment of 221 and at 222, the EAS verifier provides an illustration to the operator on a display of the terminal that indicates a position of the EAS tag on the item and a proximity distance to place the EAS tag when the configured period of time has elapsed or expired.

In an embodiment of 222 and at 223, the EAS verifier activates a beeper or a buzzer when the EAS tag has been placed in front of the scanner within the proximity distance indicating that an EAS deactivation device/mechanism has deactivated or destroyed the EAS tag on the item.

In an embodiment of 220, and at 224, the EAS verifier prevents transaction at the terminal from proceeding until the item is placed in front of the scanner within the predefined distance ensuring that the EAS tag is deactivated on the item.

Figure 3:
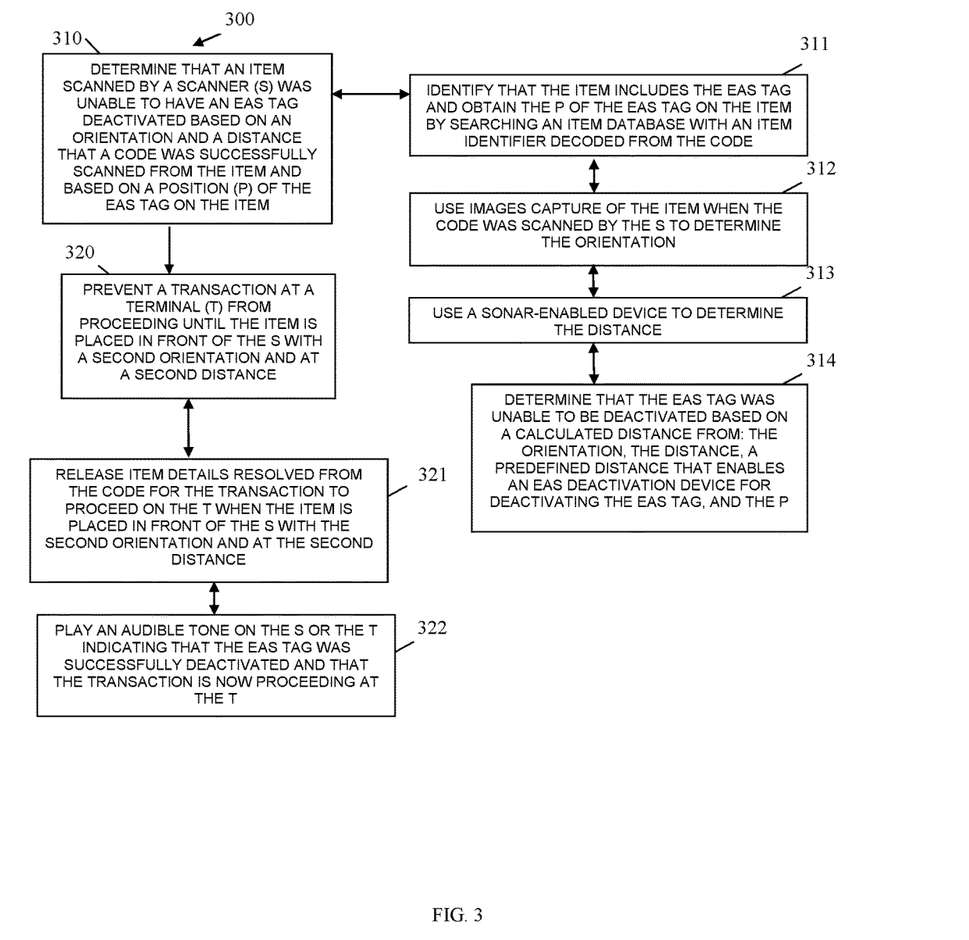
FIG. 3 is a diagram of another method for EAS tag verification, according to an example embodiment.

FIG. 3 is a diagram of another method for EAS tag verification, according to an example embodiment. The software module(s) that implements the method 300 is referred to as an "EAS transaction item verification manager." The software modules are executable instructions that are loaded into memory of a device and executed by one or more processors of that device. The EAS transaction item verification manager may have access to one or more networks during execution. The networks can be wired, wireless, or a combination of wired and wireless.

In an embodiment, the EAS transaction item verification manager presents another and in some ways enhanced processing perspective from that which was described with the FIG. 2.

In an embodiment, the device that executes the EAS transaction item verification manager is the scanner 130.

In an embodiment, the device that executes the EAS transaction item verification manager is the EAS deactivation mechanism 120.

In an embodiment, the device that executes the EAS transaction item verification manager is POS terminal 110.

In an embodiment, multiple cooperating instances of the EAS transaction item verification manager process on two or more of: the scanner 130, the EAS deactivation mechanism 120, and the POS terminal 110.

In an embodiment, the POS terminal is a SST operated by a customer during a checkout at the POS terminal.

In an embodiment, the POS terminal is a cashier-assisted terminal operated by a cashier during a customer checkout at the POS terminal.

In an embodiment, the EAS transaction item verification manager is one or more of the EAS verifiers 111, 121, and/or 131.

At 310, the EAS transaction item verification manager determines that an item scanned by a scanner was unable to have an EAS tag deactivated based on an orientation and a distance that a code was successfully scanned from the item and based on a position that EAS tag is known to be on the item.

According to an embodiment, at 311, the EAS transaction item verification manager identifies that the item includes the EAS tag and obtains the position of the EAS tag on the item by searching an item database with an item identifier decoded from the code.

In an embodiment of 311 and at 312, the EAS transaction item verification manager uses images captured of the item when the code was scanned by the scanner to determine the orientation.

In an embodiment of 312 and at 313, the EAS transaction item verification manager uses a sonar-enabled device to determine the distance.

In an embodiment of 313 and at 314, the EAS transaction item verification manager determines that the EAS tag was unable to be deactivated based on a calculated distance from: the orientation, the distance, a predefined distance that enables an EAS deactivation device for deactivating the EAS tag, and the position.

At 320, the EAS transaction item verification manager prevents a transaction at a terminal from proceeding until it is verified that the item is placed in front of the scanner with a second orientation and at a second distance.

In an embodiment, at 321, the EAS transaction item verification manager releases the item details resolved from the code for the transaction to proceed on the terminal when the item is placed in front of the scanner with the second orientation and at the second distance.

In an embodiment of 321 and at 322, the EAS transaction item verification manager plays an audible tone on the scanner or the terminal indicating that the EAS tag was successfully deactivated and indicating that the transaction is now proceeding at the terminal.

Figure 4:
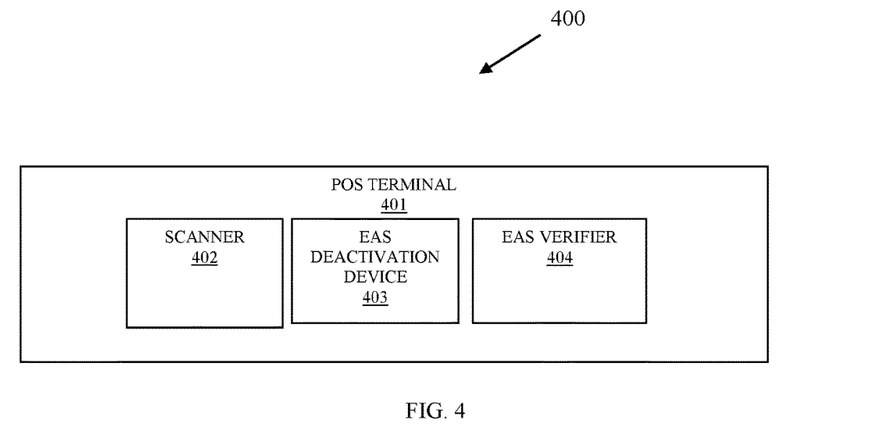
FIG. 4 is a diagram of another system for EAS tag verification, according to an example embodiment.

FIG. 4 is a diagram of another system 400 for EAS tag verification, according to an example embodiment. The system 400 includes software modules that are executed by a processor from a non-transitory memory and the system 400. The system 400 may have access to one or more networks during processing of the software modules, and the networks can be wired, wireless, or a combination of wired and wireless.

The system 400 implements, among other things, the processing discussed above with the FIGS. 1-3.

The system includes a POS terminal 401 having an integrated and/or interfaced scanner 402 and EAS deactivation device 403. The system also includes an EAS verifier 404.

In an embodiment, the POS terminal 401 is a POS terminal that is operated by a cashier during a checkout (cashier-assisted terminal).

In an embodiment, the POS terminal 401 is a SST operated by a customer during a customer checkout.

In an embodiment, the scanner 402 can be a scanner integrated into a checkout counter of the POS terminal 401.

In an embodiment, the scanner 402 is a handheld scanner.

In an embodiment, the scanner 402 is a bioptic scanner.

In an embodiment, the EAS deactivation device 403 is a device that emits an electromagnetic field that is strong enough to alter a circuit in an EAS tag on an item when the EAS tag is within a predefined distance of the EAS deactivation device 403.

In an embodiment, the EAS deactivation device 403 is integrated into the scanner 402.

In an embodiment, the EAS deactivation device 403 is situated adjacent and in close proximity to the scanner 402.

In an embodiment, EAS verifier 404 can execute as executable instructions on a processor of: the POS terminal 401, the scanner 402, or the EAS deactivation device 403.

In an embodiment, the EAS verifier 404 can execute as executable instructions on multiple processors of any combination or all of the POS terminal 401, the scanner 402, and the EAS deactivation device 403 as multiple instances of cooperating set of executable instructions.

In an embodiment, the EAS verifier 404 is one of, some combination of, or all of the EAS verifiers 111, 121, and 131.

The EAS verifier 404 is configured to: i) determine when an item that has a code scanned from the scanner 402 during a transaction at the terminal 401 includes an EAS tag that was unable to be deactivated and ii) verify that the EAS tag is deactivated by the EAS deactivation device 403 before permitting item details for the item to be processed by the terminal 401 for the transaction.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   detecting by a scanner a code associated with an item having an Electronic Article Surveillance (EAS) tag that was outside a predefined distance from the scanner, including searching a data store with an item identifier for the item that is obtained from the code to determine that the item includes the EAS tag and obtaining from the data store a position on the item where the EAS tag is situated; and
   raising an alert to an operator of a terminal indicating that the EAS tag is still activated on the item.

2. The method of claim 1, wherein detecting further includes determining an orientation of the item relative to a location of the code on the item when the code was scanned from the item by the scanner.

3. The method of claim 2, wherein determining further includes calculating a tag distance from the scanner to the position of the EAS tag and comparing the tag distance to the predefined distance to determine that the EAS tag is outside the predefined distance with which an EAS deactivation mechanism can deactivate the tag.

4. The method of claim 3, wherein calculating further includes using images taken of the item at different angles, the orientation, and the position to calculate the tag distance.

5. The method of claim 3, wherein using a sonar calculated distance, the orientation, and the position to calculate the tag distance.

6. The method of claim 1, wherein raising further includes delaying raising of the alert for a configured period of time.

7. The method of claim 6, wherein delaying further includes providing an illustration to the operator on a display of the terminal indicating a position of the EAS tag on the item and a proximity distance to place the EAS tag in front of the scanner for deactivating the EAS tag when the configured period of time has elapsed.

8. The method of claim 7 further comprising, activating a beeper or a buzzer when the EAS tag has been placed in front of the scanner within the proximity distance indicating that an EAS deactivation mechanism has deactivated the EAS tag on the item.

9. The method of claim 1, wherein raising further includes preventing a transaction at the terminal from proceeding until the item is placed in front of the scanner within the predefined distance ensuring the EAS tag is deactivated on the item.

10. A method, comprising:
    determining that an item scanned by a scanner was unable to have an Electronic Article Surveillance (EAS) tag deactivated based on an orientation and a distance that a code was successfully scanned from the item and based on a position of the EAS tag on the item, including identifying that the item includes the EAS tag and obtaining the position of the EAS tag on the item by searching an item database with an item identifier decoded from the code, and using images captured of the item when the code was scanned by the scanner to determine the orientation; and
    preventing a transaction at a terminal associated with the item from proceeding until the item is placed in front of the scanner with a second orientation and at a second distance.

11. The method of claim 10, wherein determining further includes using a sonar-enabled device to determine the distance.

12. The method of claim 11, wherein determining further includes determining that the EAS tag was unable to be deactivated based on a calculated distance from: the orientation, the distance, a predefined distance that enables an EAS deactivation device for deactivating the EAS tag, and the position.

13. The method of claim 10, wherein preventing further includes releasing item details resolved from the code for the transaction to proceed on the terminal when the item is placed in front of the scanner with the second orientation and at the second distance.

14. The method of claim 10, wherein preventing further includes play an audible tone on the scanner or the terminal indicating when the EAS tag was successfully deactivated and that the transaction is now proceeding at the terminal.

15. A system, comprising:
    a scanner;
    an Electronic Article Surveillance (EAS) tag deactivation device; and
    an EAS verifier configured to: i) determine when an item that has a code scanned from scanner during a transaction at the terminal includes an EAS tag that was unable to be deactivated, (ii) raise an alert to an operator of the terminal indicating that the EAS tag is still activated on the item, including delaying raising of the alert for a configured period of time and providing an illustration to the operator on a display of the terminal indicating a position of the EAS tag on the item and a proximity distance to place the EAS tag in front of the scanner for deactivating the EAS tag when the configured period of time has elapsed, and ii) verify that the EAS tag is deactivated by the EAS deactivation device before permitting item details for the item to be processed by the terminal for the transaction.

16. The system of claim 15, wherein the terminal is one of: a cashier-assisted terminal and a Self-Service Terminal (SST).

17. A method, comprising:
    detecting a code associated with an item by a scanner having an Electronic Article Surveillance (EAS) tag that was outside a predefined distance from the scanner; and
    raising an alert to an operator of a terminal indicating that the EAS tag is still activated on the item, including delaying raising of the alert for a configured period of time and providing an illustration to the operator on a display of the terminal indicating a position of the EAS tag on the item and a proximity distance to place the EAS tag in front of the scanner for deactivating the EAS tag when the configured period of time has elapsed.

18. The method of claim 17 further comprising, activating a beeper or a buzzer when the EAS tag has been placed in front of the scanner within the proximity distance indicating that an EAS deactivation mechanism has deactivated the EAS tag on the item.

* * * * *